United States Patent Office 3,225,110
Patented Dec. 21, 1965

3,225,110
METHOD FOR THE PRODUCTION OF
ALKALI METAL ACETYLIDES
Abraham N. Kurtz, Charleston, W. Va., assignor to Union
Carbide Corporation, a corporation of New York
No Drawing. Filed Feb. 8, 1963, Ser. No. 257,113
17 Claims. (Cl. 260—665)

This invention relates to an improved process for the production of alkali metal acetylides. More particularly, this invention relates to a process for the production of dispersions of an alkali metal acetylide in an inert organic diluent wherein the alkali metal acetylide is present in a highly reactive state. In another, and still more particular aspect, this invention relates to novel catalysts for the production of alkali metal acetylides by the reaction of an alkali metal with a terminally-acetylenically-unsaturated hydrocarbon.

The alkali metal acetylides and substituted derivatives thereof are highly useful as intermediates for the production of a wide variety of compounds. However, because the alkali metal acetylides are solids which are insoluble in most inert reaction media, their reactions are usually conducted in a two-phase system wherein the alkali metal acetylide is suspended in an inert organic diluent. As is well known, the reactivity of the suspended reactant is such a two-phase system depends greatly upon the particle size or total surface area of the suspended reactant. Prior to this invention there were two generally employed methods for producing dispersions of alkali metal acetylides. The first method comprised the addition of a solution of an alkali metal acetylide in ammonia to the selected diluent and evaporation of the ammonia from the resulting mixture. This method is undesirable because low temperatures and/or high pressures are required to maintain the ammonia in the liquid phase and, unless the ammonia is completely removed from the dispersion of the alkali metal acetylide in the diluent, it may interfere with the desired subsequent reaction. The second method, which avoids the use of ammonia, comprises dispersing an alkali metal in an organic diluent and reacting it with a terminally-acetylenically-unsaturated hydrocarbon to produce the desired alkali metal acetylide. However, the particle size of the alkali metal acetylide approximates that of the alkali metal and, because of the difficulty of obtaining fine particles of alkali metal, it is very difficult to obtain alkali metal acetylide particles of 10 microns or less in size.

It has been found by this invention, however, that when small amounts of an alkali metal hydrocarbyloxide are present in the reaction mixture of the second of the above-described processes, one can readily obtain alkali metal acetylide particles having diameters of from about 1 to about 5 microns, without the extreme rates of agitation required in the prior art process, even when large pieces of alkali metal are employed. Moreover, the alkali metal hydrocarbyloxide catalyzes the reaction of the alkali metal with the terminally-acetylenically-unsaturated compound; for example, when acetylene is reacted with a dispersion of 10–35 micron sodium, the reaction rate when sodium isopropoxide is present is approximately double the rate of the reaction when sodium isopropoxide is absent. Thus, the process of this invention comprises the reaction of an alkali metal with a terminally-acetylenically-unsaturated hydrocarbon in an inert organic diluent in contact with an effective amount of an alkali metal hydrocarbyloxide to produce an alkali metal acetylide.

By the term "alkali metal," as employed in the specification and claims, is meant a metal of Group I of the Periodic Table having an atomic number of from 3 to 55, inclusive, and includes lithium, sodium, potassium, rubidium and cesium. Francium, although technically an alkali metal, does not occur naturally and thus, is not contemplated by this invention.

By the term "terminally-acetylenically-unsaturated hydrocarbon," as employed in the specification and claims, is meant a hydrocarbon compound having one terminal acetylenic triple bond; i.e., a hydrocarbon compound having an acetylenic linkage wherein one carbon atom of the acetylenic linkage is bonded to hydrogen and the other carbon atom is bonded to hydrogen or a hydrocarbon group free from acetylenic unsaturation. These compounds are represented by the general formula:

(I)  $HC \equiv C-R$ wherein R is either hydrogen or a hydrocarbon radical which is free from acetylenic unsaturation, such as, alkyl including methyl, ethyl, propyl, isopropyl, butyl, tert-butyl, amyl, 2-ethylhexyl, decyl, octadecyl and the like; alkenyl, such as vinyl, allyl, butenyl, octenyl and the like; aryl, such as phenyl or napthyl; alkaryl such as tolyl, xylyl, mesityl and the like; aralkyl such as benzyl, phenethyl and the like; etcetera. In general, the hydrocarbon radical can contain up to about 20 carbon atoms, with radicals such as alkyl of 1 to 6 carbon atoms, phenyl and vinyl being preferred.

By the term "alkali metal acetylide," as employed in the specification and claims, is meant a terminally-acetylenically-unsaturated hydrocarbon compound wherein the hydrogen atom on one of the acetylenic carbon atoms has been substituted by an alkali metal. These compounds can be represented by the general formula:

(II)  $M-C \equiv CR$ wherein R is as defined above and M is an alkali metal, as defined above.

By the term "inert organic diluent" is meant an organic compound which is liquid at the reaction conditions and does not react to any appreciable extent with the alkali metal, the terminally-acetylenically-unsaturated hydrocarbon or the alkali metal acetylide. Suitable compounds are obvious to any chemist. For example, because alkali metal acetylides react with compounds containing hydroxyl groups, N-unsubstituted amide groups, halogen atoms or carbonyl groups, whether in the form of carboxyl groups, ester linkages, keto groups or aldehyde groups, the alcohols, amides, halohydrocarbons, ketones, carboxylic acids, esters or aldehydes cannot be employed as the inert organic diluent. As examples of suitable inert organic diluents one can mention aliphatic hydrocarbons such as kerosene or ligroin (petroleum ether); aromatic hydrocarbons such as benzene, toluene, xylene and the like; ethers, including acyclic monoethers such as ethyl ether, isopropyl ether, butyl ether, methoxy benzene, vinyl butyl ether, nonyl ether and the like, acyclic polyethers such as methyl ethyl glycol, acetal, methylal, 1,1-dimethoxyethane, 1,1-diethoxybutane, 1,1-dimethoxy-4-methylpropane, diethoxymethane, 2,2-diethoxypropane, 1,1,5,5-tetraethoxy-3-methylpentane, 1,1,3,3-tetraethoxypropane, the dimethyl ether of ethylene glycol, the diethyl ether of ethylene glycol, diethoxytriglycol, 1,1-diethoxy-2-ethylhexane and the like; cyclic mono- and polyethers such as tetrahydrofuran, tetrahydropyran, N-methylmorpholine, 1,4-dioxane, 2-ethoxytetrahydropyran, 2,5-diethoxytetrahydrofuran, 2-ethoxy-2,3-dihydropyan, etc.

By the term "alkali metal aliphatic hydrocarboxyloxide," as employed in the specification and claims, is meant an alkali metal salt of a monohydric, non-phenolic alcohol, whose hydroxyl group is bonded to a saturated carbon atom; i.e., a carbon atom having only single bonds to other carbon atoms. The alkali metal aliphatic hydrocarbyloxides can be represented by the general formula:

(III) $\qquad R^1OM$ wherein M is as defined above and $R^1$ is a monovalent hydrocarbon group whose bond to the oxygen atom is from a non-aromatic, saturated carbon, such as alkyl groups including methyl, ethyl, n-propyl, isopropyl, n-butyl, tert-butyl, isobutyl, pentyl, hexyl, heptyl, 2-ethylhexyl, decyl, undecyl, eicosyl and the like; aralkyl groups such as benzyl, phenethyl, and the like; alkenyl groups such as allyl, crotyl and the like; alkynyl groups such as propynyl, butynyl, pentynyl, octynyl, and the like; etcetera.

The alkali metal hydrocarbyloxides can be added to the reaction mixture per se or they can be formed in situ by the addition of compounds which will react with a component of the reaction mixture to form an alkali metal hydrocarbyloxide. For example, alcohols, which react with alkali metals, or aldehydes or ketones, which react with an alkali metal acetylide according to the equation:

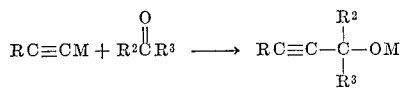

wherein M and R are as defined above and $R^2$ and $R^3$ are either hydrogen or a monovalent hydrocarbon group, can be added to the mixture to form alkali metal hydrocarblyoxides.

As examples of suitable alcohols one can mention methanol, ethanol, n-propanol, isopropanol, n-butanol, sec-butanol, tert.-butanol, isobutanol, pentanol, hexanol, 2-ethylhexanol, undecanol, eicosanol, allyl alcohol, croty alcohol, benzol, 2-phenylethanol, 2-methyl-3-butyn-2-ol, and the like.

As examples of suitable aldehydes one can mention formaldehyde, acetaldehyde, propionaldehyde, caproaldehyde, acrolein, crotoaldehyde, cinnamaldehyde, p-tolualdehyde, benzaldehyde, 1-naphthaldehyde and the like.

As examples of suitable ketones one can mention acetone, methyl ethyl ketone, 2-pentanone, 3-pentanone, butyrone, 4-heptanone, acetophenone, 1-cyclohexyl-2-methyl-1-propanone, cyclopentanone, cyclohexanone and the like.

In general, the alkali metal hydrocarbyloxide should contain from 1 to about 20 carbon atoms. Those containing from 1 to about 8 carbon atoms are preferred because, in addition to assisting in the formation of fine alkali metal acetylide dispersions, they catalyze the reaction of the alkali metal with the terminally-acetylenically-unsaturated hydrocarbon. Thus, alcohols containing from 1 to about 20, and preferably from 1 to about 8, carbon atoms can be employed. The aldehydes and ketones which are suitable are those containing from 1 to about (20–X), preferably from 1 to about (8–X), carbon atoms, wherein X is the number of carbon atoms in the alkali metal acetylide desired as a product. For example, when sodium acetylide (NaC≡CH) is the desired product, aldehydes and ketones having from 1 to about 18, preferably 1 to about 6, carbon atoms are employed.

The process of this invention is conducted by admixing the selected inert organic diluent with an alkali metal and either an alkali metal hydrocarbyloxide or an aliphatic alcohol, aldehyde or ketone, and then contacting the resulting mixture with the terminally-acetylenically-unsaturated hydrocarbon compound. It is preferred, however, to admix the alkali metal with the inert organic diluent, contact the mixture with the terminally-acetylenically-unsaturated hydrocarbon compound, and then add either the alkali metal hydrocarbyloxide or the aliphatic alcohol, aldehyde or ketone. When this latter procedure is employed, the alkali metal hydrocarbyloxide or alkali metal hydrocarbyloxide-forming compound should be added before 50 percent of the alkali metal charged has been reacted, and preferably before about 5 percent of the alkali metal has reacted.

The ratio of alkali metal to inert organic diluent in the initial charge is not critical. However, amounts of alkali metal of from about 1 to about 25 weight percent, based on the weight of inert organic diluent have been found satisfactory, with amounts of from about 2 to about 10 weight percent being preferred.

The effective amount of the alkali metal hydrocarbyloxide or alkali-metal hydrocarbyloxide-yielding compound is from about 0.5 to about 10 mole percent, based on the amount of alkali metal charged, with amounts of from 1 to about 5 mole percent being preferred.

The terminally-acetylinically-unsaturated compounds are normally employed in molar excess over the alkali metal charged. Because these compounds are generally gases, the reaction is usually conducted by bubbling the acetylenic hydrocarbon through the reaction mixture until the reaction ceases. The pressure of the gaseous hydrocarbon is not critical and pressures of about 0.5 atmosphere or less to about 20 atmospheres or more can be employed. Pressures of about atmospheric pressure are preferred.

It is preferred to employ known dispersing aids for alkali metals, such as fatty acids and their heavy metal salts; e.g., oleic acid or aluminum stearate, in the reaction. The alkali metal acetylide normally forms as a gel and, unless a dispersing aid is employed, large amounts of inert organic diluent are necessary to maintain the reaction mixture in a fluid state. The amount of dispersing aid can vary from about 0.01 to about 1.0 mole percent, based on moles of alkali metal charged, with from about 0.2 to 0.5 mole percent being preferred, and is usually charged to the initial reaction mixture.

The reaction temperature is not critical, and can vary from about 50° C. to about 150° C., with temperatures of from about 90° C. to about 120° C. being preferred. The reaction is preferably conducted under an inert, i.e. oxygen-free, atmosphere, usually under an atmosphere of nitrogen or the acetylenic hydrocarbon employed in the reaction. The reaction mixture should be well agitated to prevent settling or coalescence of the alkali metal acetylide particles. However, extremely high rates of agitation, such as are required when the alkali hydrocarbyloxide is not present, are not necessary.

The following examples are illustrated.

*Example 1*

A one-liter, creased flask equipped with a dispersator-type agitator was flushed with nitrogen and charged with 230 milliliters of xylene, 23 grams of sodium, and 0.115 gram of oleic acid as a dispersing agent for the sodium. The flask was sealed and heated at 105° C. for 5 minutes under a nitrogen atmosphere and with full agitation (20,000 r.p.m.) to produce a dispersion of sodium particles ranging from about 25 to 50 microns in size. The nitrogen flow was discontinued and acetylene at one atmosphere was passed through the flask at a rate of one mole per hour, while heating the contents at 110° C. After 15 minutes, a mixture of 100 milliliters of xylene and 1.2 grams of isopropanol was added to the reaction mixture, whereupon the color of the mixture changed from black to blue, indicative of a rapid increase in the rate of reaction. After 10 minutes the dispersator speed was reduced to 2000 r.p.m., a speed too low to cause any size reduction of either the sodium or the product sodium acetylide. After an additional hour, the reaction mixture became very viscous and an additional 100 milliliters of xylene were added to maintain even slight stirring. The reaction was complete in two hours of acetylene on-stream time, as indicated by the white color of the reaction mixture and the cessation of the absorption of acetylene. The system was cooled to 25° C. and was found, by microscopic examination, to contain rod-like particles of sodium acetylide having an average length of about 1 micron. This dispersion did not settle on standing.

The reactivity of the sodium acetylide thus produced was tested by charging the dispersion, together with 400 milliliters of xylene, to a 3-liter rocker bomb and reacting the sodium acetylide with carbon dioxide at a temperature of 25 to 34° C. and a pressure of from 110 to 400 p.s.i.g. to produce sodium propiolate. The reaction was complete after 1.5 hours as determined by the cessation of the absorption of carbon dioxide. A 100 milliliter aliquot of the carbonated slurry was filtered and dried giving 9.3 grams of crude product containing 50 weight percent sodium propiolate as determined by infrared analysis.

In a similar experiment, conducted without the addition of isopropanol, and maintaining the dispersator at 20,000 r.p.m. for the entire period, the reaction of sodium with acetylene was complete in 3 hours and the sodium acetylide thus produced had a particle size of from about 5 to 15 microns. Carbonation of this dispersion in the manner described above, except that the carbon dioxide pressure varied from 110 to 690 p.s.i.g., was complete in 2.5 hours and there were recovered 74 grams of product containing 72.6 weight percent sodium propiolate.

Example 2

A 1-liter flask, equipped with a stirrer consisting of six 1½-inch by 1/16-inch stainless steel wires welded to a flat disk and curved to fit the flask, was charged with 430 milliliters of xylene, 23 grams of sodium cut into 6 pieces, and 0.115 gram oleic acid. The flask was sealed and heated at 105° C. for five minutes under a nitrogen atmosphere, with stirring at 1100 r.p.m., whereby a dispersion of sodium particles of 1 to 2 millimeters in diameter was obtained. The reaction mixture was heated at 108–9° C. and acetylene at atmospheric pressure was introduced into the flask at a rate of one mole per hour. After 15 minutes, a solution of 1.206 grams of isopropanol in 30 milliliters of xylene was added to the flask. After ½ hour the rate of reaction rapidly increased as indicated by an increase in the rate of consumption of acetylene. After two hours of acetylene on-stream time the reaction was complete, as indicated by the white color of the reaction mixture and the cessation of the absorption of acetylene. The sodium acetylide particles which were prouced were found by microscopic examination to be irregularly shaped and of about 1 micron or less in size.

Example 3

A 1-liter, creased flask equipped with a stirrer having a hemispherical stirrer blade was charged with 200 milliliters of xylene, 23 grams of sodium and 1.15 grams of oleic acid. The mixture was heated for 15 minutes at 105° C. under nitrogen, while stirring at 500 r.p.m. The mixture was heated to 110° C. and acetylene at atmospheric pressure was bubbled through the mixture at a rate of one mole per hour. After 15 minutes a solution of 1.2 grams of isopropanol is 30 milliliters of xylene was added, and after a total of 2 hours of total acetylene onstream time the reaction was complete. The resulting dispersion was very fluid and contained uniformly sized, 1-micron, rounded sodium acetylide particles.

The reaction mixture was transferred, together with 50 milliliters of xylene, to a 3-liter rocker bomb, and carbonated at 25–31° C. and 400 p.s.i.g. in the manner described in Example 1. The carbonation was complete after only 33 minutes.

Example 4

Employing apparatus and procedures similar to those described in Example 2, 1380 milliliters of a commercially available kerosene fraction and 69 grams of sodium were charged to the flask and contacted with acetylene. After 15 minutes of acetylene on-stream time, a solution of 3.605 grams of isopropanol in an additional 90 milliliters of the kerosene fraction were added. After 4 hours, the reaction mixture was too viscous to stir, and 300 milliliters of kerosene were added. The reaction was complete after a total of 7 hours of acetylene on-stream time. The sodium acetylide particles had a diameter of 3 to 5 microns.

Example 5

Employing apparatus and procedures similar to those described in Example 2, except that 3.452 grams of undecanol were substituted for the isopropanol there was produced a dispersion of 1 to 5 micron particles of sodium acetylide.

Example 6

Employing apparatus and procedures similar to those described in Example 2, except that 1.18 grams of acetone was substituted for the isopropanol, there was produced a dispersion of sodium acetylide having a particle size of less than 1 micron in a total reaction time of 2.28 hours.

Example 7

Employing apparatus and procedures similar to those described in Example 1, except that 1.70 grams of 2-methyl-3-butyn-2-ol were substituted for the isopropanol, there was produced a dispersion of about one-half-micron sodium acetylide particles in a total reaction time of 2.35 hours.

Example 8

Employing apparatus and procedures similar to those described in Example 3, except that the diethyl ether of diethylene glycol was substituted for xylene, there was produced a dispersion of needle-shaped crystalline-appearing sodium acetylide particles having a smallest dimension of about 1 micron in a total reaction time of 1.7 hours.

Example 9

Employing apparatus and procedures similar to those described in Example 3, except that the dibutyl ether of diethylene glycol was substituted for xylene, there was produced a dispersion of one-micron sodium acetylide particles in a total reaction time of 2 hours.

What is claimed is:

1. In the method for producing an alkali metal acetylide by the reaction of an alkali metal with a terminally-acetylenically unsaturated hydrocarbon in an inert organic diluent, the improvement of conducting said reaction in contact with an effective amount of an alkali metal aliphatic hydrocarbyloxide having from 1 to 20 carbon atoms, said effective amount being an amount sufficient to promote the production of alkali metal acetylide particles having a particle size which is substantially smaller than the size of the particles of alkali metal charged.

2. In the method for producing an alkali metal acetylide by the reaction of an alkali metal with a terminally-acetylenically unsaturated hydrocarbon in an inert organic diluent, the improvement of conducting said reaction in contact with an effective amount of an alkali metal aliphatic hydrocarbyloxide having from 1 to 8 carbon atoms, said effective amount being an amount sufficient to promote the production of alkali metal acetylide particles having a particle size which is substantially smaller than the size of the particles of alkali metal charged.

3. In the method for producing an alkali metal acetylide by the reaction of an alkali metal with a terminally-acetylenically unsaturated hydrocarbon compound in an inert organic diluent, the improvement of adding an effective amount of an alkali metal aliphatic hydrocarbyloxide containing from 1 to 20 carbon atoms to the reaction mixture before 50 percent of the alkali metal charged has reacted, said effective amount being an amount sufficient to promote the production of alkali metal acetylide particles having a particle size which is substantially smaller than the size of the particles of the alkali metal charged.

4. In the method for producing an alkali metal acetylide by the reaction of an alkali metal with a terminally-acetylenically unsaturated hydrocarbon compound in an inert organic diluent, the improvement of adding an effective amount of an alkali metal aliphatic hydrocarbyloxide containing from 1 to 8 carbon atoms to the reaction mixture before 50 percent of the alkali metal charged has reacted, said effective amount being an amount sufficient to promote the production of alkali metal acetylide particles having a particle size which is substantially smaller than the size of the particles of the alkali metal charged.

5. In the process for producing sodium acetylide by the reaction of sodium with acetylene in an inert organic diluent, the improvement of adding an effective amount of a sodium aliphatic hydrocarbyloxide having from 1 to 20 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

6. In the process for producing sodium acetylide by the reaction of sodium with acetylene in an inert organic diluent, the improvement of adding an effective amount of a sodium aliphatic hydrocarbyloxide having from 1 to 8 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

7. In the process for producing sodium acetylide by the reaction of sodium with acetylene in an inert organic diluent, the improvement of adding an effective amount of a non-phenolic, monohydric alcohol containing from 1 to 20 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

8. In the process for producing sodium acetylide by the reaction of sodium with acetylene in an inert organic diluent, the improvement of adding an effective amount of a non-phenolic, monohydric alcohol containing from 1 to 8 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

9. In the process for producing sodium acetylide by the reaction of sodium with acetylene in an inert organic diluent, the improvement of adding an effective amount of isopropyl alcohol to the reaction mixture before 50 percent of the sodium charged has reacted, said effective amount being an amount sufficient to promote the production of sodium acetylide particles having a particle size which is substantially smaller than the size of the particles of the sodium charged.

10. In the process for producing sodium acetylide by the reaction of sodium with acetylene in an inert organic diluent, the improvement of adding an effective amount of tert.-butanol to the reaction mixture before 50 percent of the sodium charged has reacted, said effective amount being an amount sufficient to promote the production of sodium acetylide particles having a particle size which is substantially smaller than the size of the particles of the sodium charged.

11. In the process for producing sodium acetylide by the reaction of sodium with acetylene in an inert organic diluent, the improvement of adding an effective amount of 2-methyl-3-butyn-2-ol to the reaction mixture before 50 percent of the sodium charged has reacted, said effective amount being an amount sufficient to promote the production of sodium acetylide particles having a particle size which is substantially smaller than the size of the particles of the sodium charged.

12. In the process for producing sodium acetylide by the reaction of sodium with acetylene in an inert organic diluent, the improvement of adding an effective amount of undecanol to the reaction mixture before 50 percent of the sodium charged has reacted, said effective amount being an amount sufficient to promote the production of sodium acetylide particles having a particle size which is substantially smaller than the size of the particles of the sodium charged.

13. In the process for producing sodium acetylide which comprises reacting sodium with acetylene in an inert organic diluent, the improvement of adding an effective amount of an aldehyde containing from 1 to 18 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

14. In the process for producing sodium acetylide by the reaction of sodium with acetylene in an inert organic diluent, the improvement of adding an effective amount of an aldehyde containing from 1 to 6 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

15. In the process for producing sodium acetylide by the reaction of sodium with acetylene in an inert organic diluent, the improvement of adding an effective amount of a ketone containing from 3 to 18 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

16. In the process for producing sodium acetylide by the reaction of sodium with acetylene in an inert organic diluent, the improvement of adding an effective amount of a ketone containing from 3 to 6 carbon atoms to the reaction mixture before 50 percent of the sodium charged has reacted, said effective amount being an amount sufficient to promote the production of sodium acetylide particles having a particle size which is substantially smaller than the size of the particles of the sodium charged.

17. In the process for producing sodium acetylide by the reaction of sodium with acetylene in an inert organic diluent, the improvement of adding an effective amount of acetone to the reaction mixture before 50 percent of the sodium charged has reacted, said effective amount being an amount sufficient to promote the production of sodium acetylide particles having a particle size which is substantially smaller than the size of the particles of the sodium charged.

References Cited by the Examiner

UNITED STATES PATENTS 2,125,384   8/1938   Macallum _____ 260—665

OTHER REFERENCES

Lindsay et al.: Advances in Chemistry Series, No. 23, p. 71, September 1959, QD 411 A5 C.3.

TOBIAS E. LEVOW, *Primary Examiner.*